(12) United States Patent
Dadu et al.

(10) Patent No.: US 8,332,631 B2
(45) Date of Patent: Dec. 11, 2012

(54) SECURE SOFTWARE LICENSING AND PROVISIONING USING HARDWARE BASED SECURITY ENGINE

(75) Inventors: Saurabh Dadu, Tigard, OR (US); Rajesh Poornachandran, Beaverton, OR (US); Gyan Prakash, Beaverton, OR (US); Selim Aissi, Beaverton, OR (US); Hormuzd M. Khosravi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 268 days.

(21) Appl. No.: 12/951,853

(22) Filed: Nov. 22, 2010

(65) Prior Publication Data

US 2012/0131345 A1 May 24, 2012

(51) Int. Cl.
*G06F 15/16* (2006.01)
*G06F 12/00* (2006.01)
(52) U.S. Cl. .................. 713/156; 713/171; 709/225
(58) Field of Classification Search .................. 713/156, 713/171; 709/223–229
See application file for complete search history.

(56) References Cited

U.S. PATENT DOCUMENTS

| 7,809,648 B2 | 10/2010 | Misra et al. |
| 7,814,023 B1 | 10/2010 | Rao et al. |
| 2003/0196099 A1* | 10/2003 | Lampson et al. ............. 713/189 |
| 2006/0179002 A1 | 8/2006 | Brooks et al. |
| 2007/0206799 A1* | 9/2007 | Wingert et al. ............... 380/285 |
| 2007/0219917 A1* | 9/2007 | Liu et al. .......................... 705/59 |
| 2008/0005033 A1 | 1/2008 | Clark et al. |
| 2008/0178298 A1* | 7/2008 | Arai et al. ........................ 726/29 |
| 2008/0196091 A1* | 8/2008 | Kostal et al. ..................... 726/5 |
| 2010/0185854 A1* | 7/2010 | Burns et al. .................... 713/165 |

FOREIGN PATENT DOCUMENTS

| WO | 2012/071168 A2 | 5/2012 |
| WO | 2012/071168 A3 | 7/2012 |

OTHER PUBLICATIONS

International Search Report and Written Opinion received for PCT Patent Application No. PCT/US2011/059692, mailed on May 18, 2012, 10 pages.

* cited by examiner

*Primary Examiner* — Zarni Maung
(74) *Attorney, Agent, or Firm* — Steven Skabrat

(57) ABSTRACT

Provisioning a license and an application program from a first server to a computing platform over a network. The host application derives a symmetric key at least in part from a user password, and sends the license to a license management firmware component of a security engine, in a message signed by the symmetric key. The license management firmware component derives the symmetric key at least in part from the user password stored in a secure storage of the security engine, verifies the signature on the message using the symmetric key, verifies the first server's signature on the license, decrypts the license using a first private key of the license management firmware component corresponding to the first public key to obtain the second key, and sends the second key to the host application, which decrypts the application program using the second key.

30 Claims, 6 Drawing Sheets

SECURE SOFTWARE LICENSING AND PROVISIONING USING HARDWARE BASED SECURITY ENGINE

FIELD

The present disclosure generally relates to the field of computing. More particularly, an embodiment of the invention relates to secure licensing of software to a computing platform using a hardware based security engine.

BACKGROUND

Computing devices are used by end users with software that may require accurate licensing/versioning systems provided by software service providers or other vendors. Current software licensing mechanisms are typically either based on proprietary hardware (such as a dongle, for example) or use secure cryptographic keys via operating system (OS) provided security features. These mechanisms rely on the OS and its services to secure the keys used for encryption/decryption and may enforce a lease time period for SW licenses based on specific defined policies. The OS-controlled applications are easy targets for computer viruses, hackers, and those users with malicious intentions. They can employ sophisticated tools to search for the keys hidden in the OS managed storage or they may find ways to bypass the policies, for example, by extending the lease time by changing the computing system time, or by replacing the file that a document viewer uses to read the policies with a valid file with different parameters obtained from another system. The proprietary hardware solutions are costly, limit the user to one vendor, and do not allow vendors to develop quick and innovative solutions. Thus, improved secure mechanisms for licensing software to computing systems are needed.

BRIEF DESCRIPTION OF THE DRAWINGS

The detailed description is provided with reference to the accompanying figures. The use of the same reference numbers in different figures indicates similar or identical items.

DETAILED DESCRIPTION

Embodiments of the present invention provide software licensing mechanisms that utilize a hardware-implemented security engine (SE). The SE may be embedded in the chipset of a computing platform, is independent of the host OS, and can communicate securely with a remote server for authentication. The use of a hardware component that is independent of the host OS to protect cryptographic keys required for decrypting a software license and/or restricted software (such as an application program, for example), and for enforcing policies such as lease time periods, makes the security solution more secure compared to purely software-based solutions. It may be much more difficult to hack the SE to obtain the keys, as compared to software-only solutions, because the SE cannot be tampered with by user level or OS software.

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs stored on a computer readable storage medium ("software"), or some combination of hardware and software. For the purposes of this disclosure reference to "logic" shall mean hardware, software (including for example micro-code that controls the operations of a processor), firmware, or some combination thereof.

Figure 1:
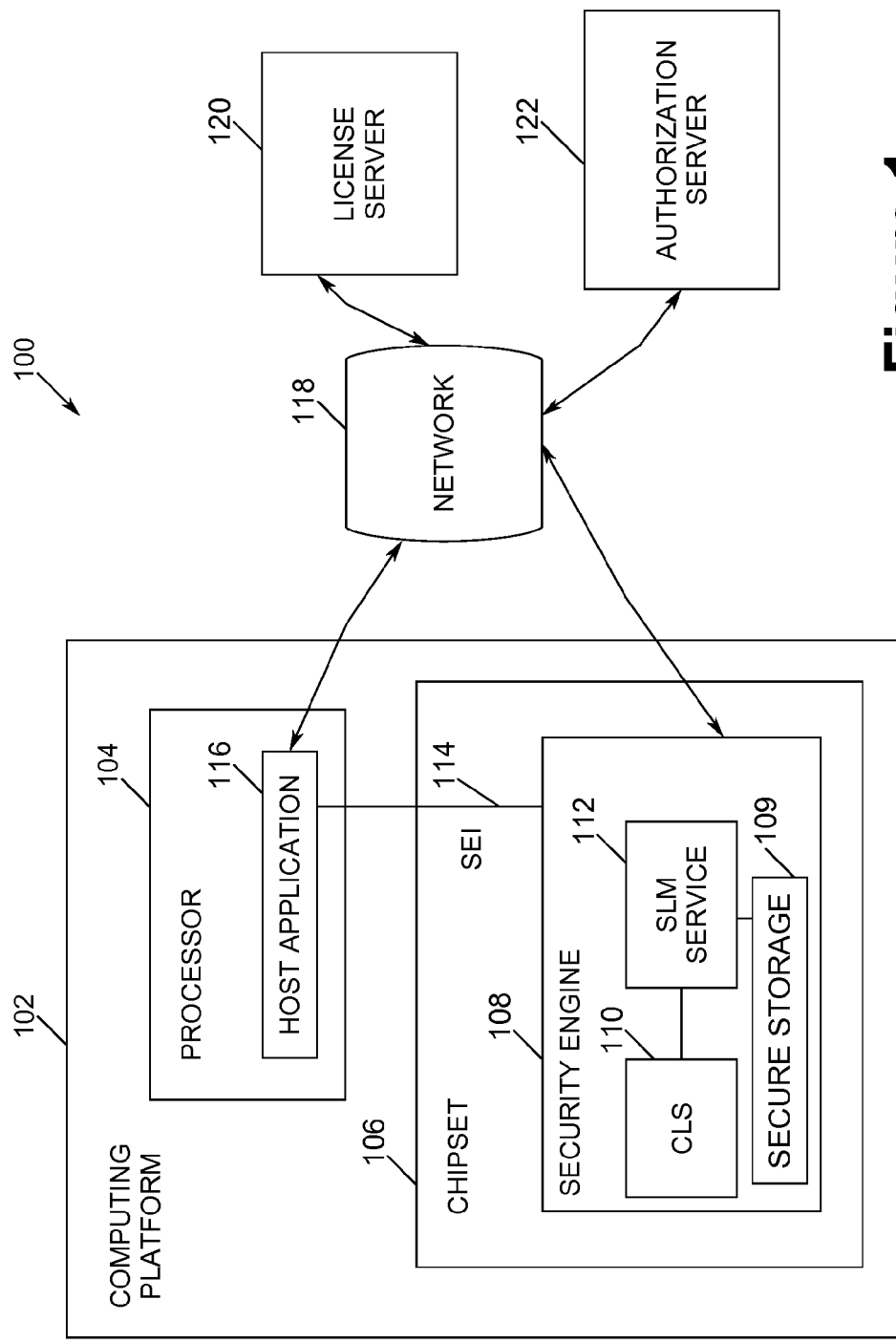
FIG. 1 is a diagram of a system architecture according to an embodiment of the present invention.

FIG. 1 is a diagram of a system architecture 100 according to an embodiment of the present invention. For purposes of clarity, FIG. 1 includes a simplified diagram of a computing platform 102. Computing platform may be any type of computing device having at least one processor and at least one memory. In an embodiment, the computing platform comprises a handheld and/or mobile computing device, such as a cellular phone, smart phone, tablet, personal device assistant (PDA), netbook, or the like. In an embodiment wherein the computing platform is a handheld and/or mobile device, requiring a hardware dongle as in prior art systems is impractical and problematic. A more detailed example of one embodiment of a computing platform is discussed below with reference to FIG. 6.

Embodiments of the present invention use an embedded microcontroller called a Security Engine (SE) 108 to provide secure execution and storage environments for licensing, provisioning, and deterrence of unauthorized usage of restricted software. In an embodiment, the Security Engine 108 may be implemented as functionality within a well known Manageability Engine (ME) hardware component within a chipset 106. In other embodiments, the Security Engine may be implemented as circuitry within chipset 106 apart from a ME. The SE comprises firmware that runs on the microcontroller in a secure execution environment and provides a secure storage area 109 which is protected from tampering by user level programs, the operating system (OS), or the basic input/output system (BIOS) running on a processor within the computing platform 102. In an embodiment, the secure storage may store cryptographic keys and other data which may be used for software licensing purposes. Secure storage may comprise any type of memory.

In an embodiment, the SE comprises at least two firmware modules. A Secure License Management (SLM) Service 112 comprises a firmware module that manages the storage of keys needed to decrypt license information and associated policies. A Capability Licensing Service (CLS) 110 comprises a firmware module that provides secure provisioning of the SLM Service in the SE. The computing platform 102 includes at least one processor 104 coupled to chipset 106. Processor 104 may execute an application program called Host Application 116. The Host Application manages interaction with a user of the computing platform for purposes of obtaining and authorizing usage of restricted software installed on the computing platform. Restricted software comprises software that the software vendor desires to restrict access to according to a defined policy and governed by a license. In an embodiment, Host Application 116 communicates with the SE 108 over a Security Engine Interface (SEI) 114. In various embodiments, the SEI may be implemented according one of known standard or proprietary communications interfaces. The SE exposes its capabilities to the OS (not shown in FIG. 1) and Host Application via public/private secure application program interfaces (APIs).

The computing platform 102 communicates with a network 118 using known methods. In an embodiment, the network comprises the Internet. In an embodiment, host application 116 may communicate with the network, and SE 108 may also communicate with the network, independent of the host application 116 or any other programs being executed by the processor 104 (whether user level programs or the OS). Thus, SE 108 provides another communications channel for the computing platform, apart from programs executed by the processor. A License Server 120 may be coupled to the network to provide the capabilities of provisioning licenses and communicating policies and decryption keys to the SE. In an embodiment, the License Server supplies the restricted software to the user's computing platform. In an embodiment, there may be multiple License Servers. In an embodiment, each License Server may be operated by a software vendor (independent software vender (ISV)). An Authorization Server 122 may be coupled to the network to enable the CLS, and to activate and deactivate the CLS 110 and the SLM Service 112 within the SE.

In an embodiment, prior to obtaining and licensing a software application, the SLM Service 112 must be activated. The activation may be accomplished using the Authorization Server 122. In an embodiment, the SE may be provided access to the public portion of the Authorization Server's cryptographic key, which may fused into the computing platform's chipset 106 at the time of manufacturing the computing platform. Using the Authorization Server's public key, the SE may create a secure communications channel with the Authorization Server. The activation flow follows a CLS activation process with some modifications required for the SLM Service. The activation process stores the License Server's public key in the SE, so that the SLM Service and the License Server can create a secure communications channel between them.

Figure 2:
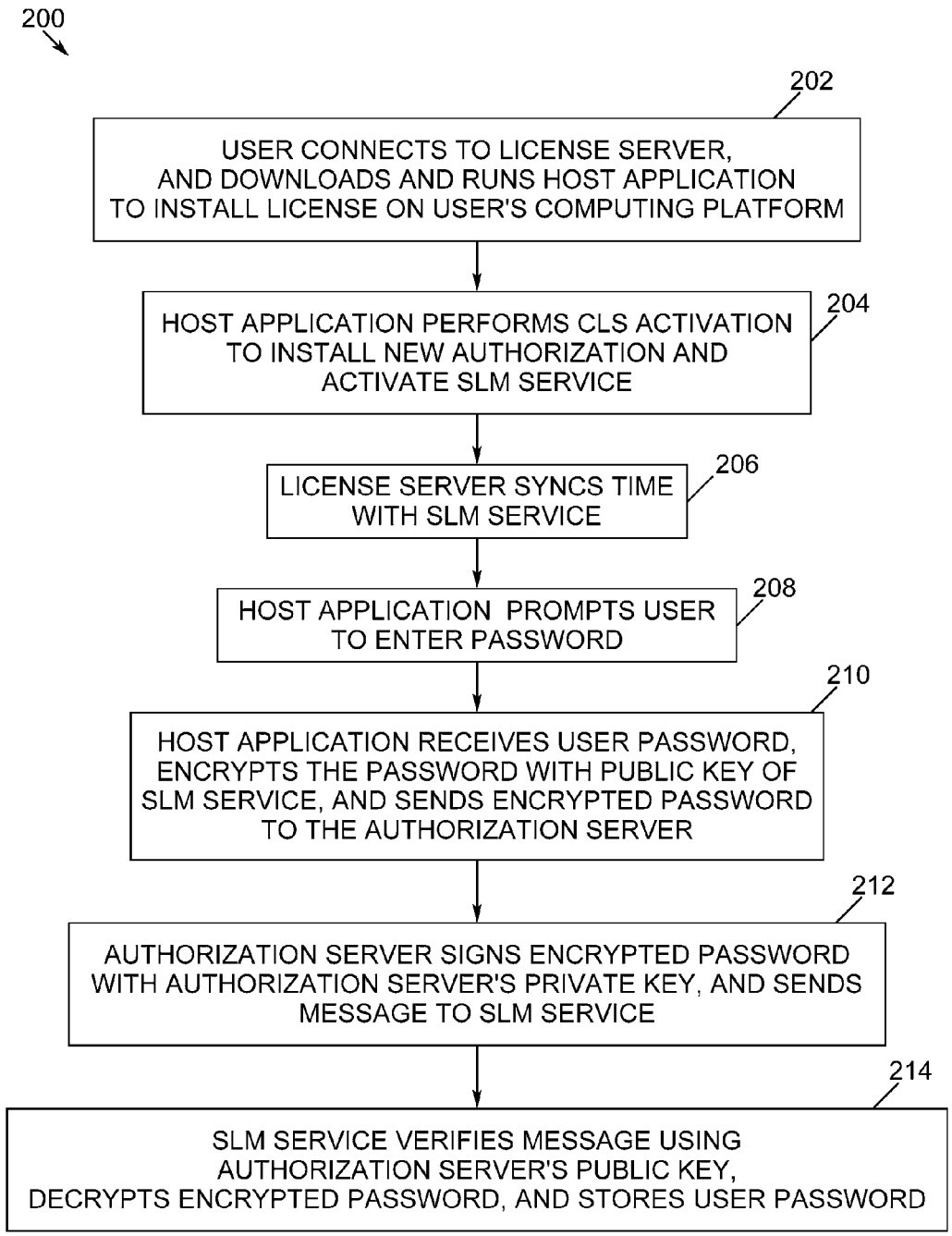
FIG. 2 is a diagram of a process for activating the secure license management service according to an embodiment of the present invention.

FIG. 2 is a diagram of a process 200 for activating the SLM Service according to an embodiment of the present invention. At block 202, the user connects to the License Server 120, and downloads and runs the Host Application to install a license to desired restricted software on the user's computing platform 102. This connection may be made using a web browser, as is well known. The restricted software may be any program to be used by the user on the computing platform wherein access to the software is restricted according to a license mechanism. At block 204, the Host Application runs and performs the CLS activation process to install a new Authorization and activate the SLM Service 112. In an embodiment, this processing may be performed only once for the computing platform. In another embodiment, this processing may be performed prior to any installation of restricted software.

Figure 3:
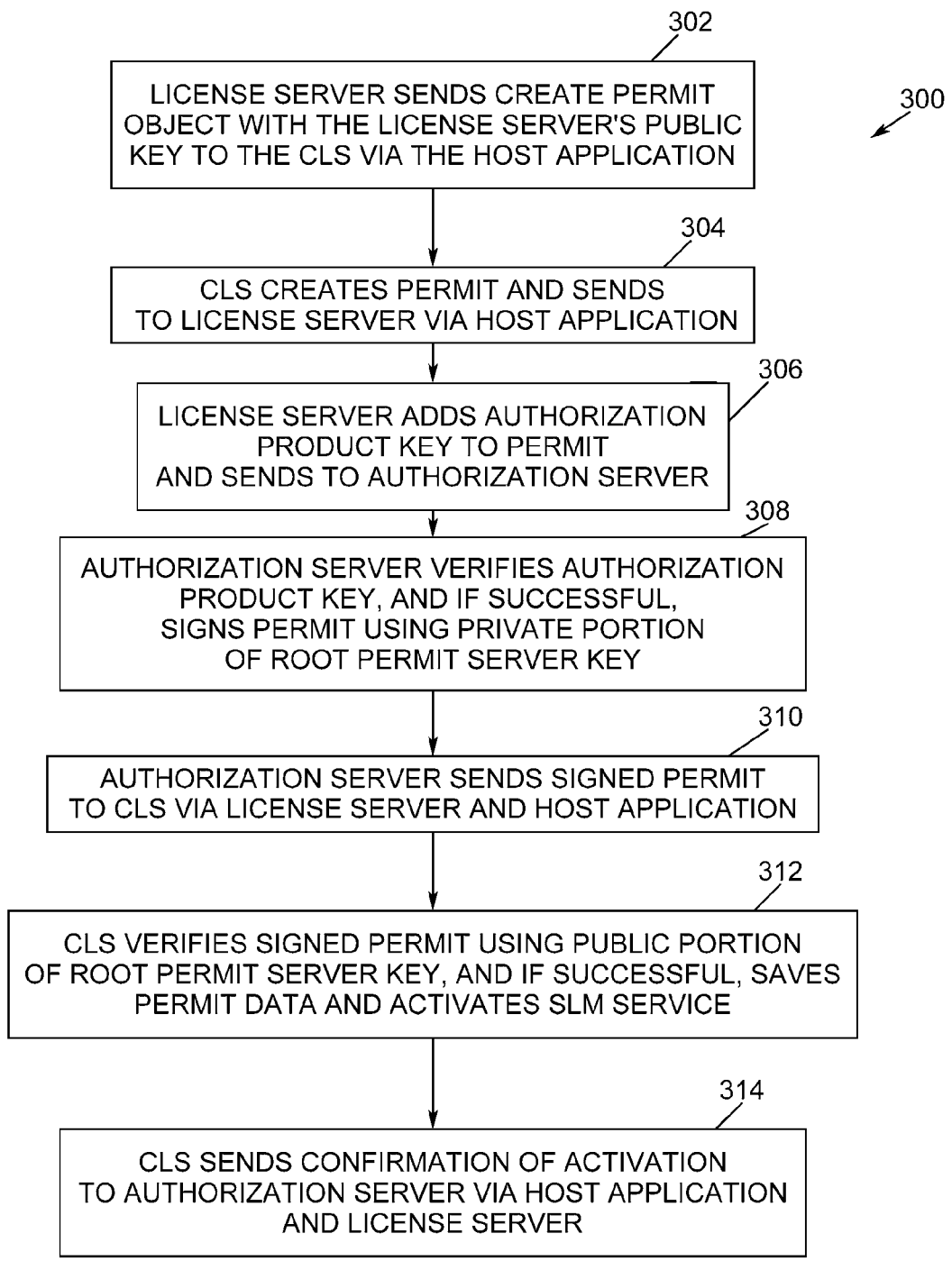
FIG. 3 is a diagram of a process for activating the capability licensing service according to an embodiment of the present invention.

FIG. 3 is a diagram of a process 300 for activating the capability licensing service (CLS) according to an embodiment of the present invention. At block 302, License Server 120 sends a create permit object with the License Server's public key to CLS 110 within SE 108 via Host Application 116 and SEI 114. At block 304, the CLS creates the permit using the create permit object, and sends the permit to the License Server via the Host Application. At block 306, the License Server adds an authorization product key to the permit and sends the combined license and permit to Authorization Server 122. At block 308, the Authorization Server verifies the authorization product key, and if successful, signs the permit using the private portion of a root permit server key (RPSK). The public portion of the RPSK is stored in SE 108 at the time of manufacturing of computing platform 102. Next, at block 310, the Authorization Server sends the signed permit to the CLS via the License Server and the Host Application. Upon receiving the signed permit, the CLS at block 312 verifies the signed permit using the public portion of the RPSK, and if successful, saves permit data and activates the SLM Service. Finally, at block 314, the CLS sends an activation confirmation back to the Authorization Server via the Host Application and License Server.

In an embodiment, the Authorization Server may be owned and/or operated by the manufacturer of the SE. The License Server may be owned and/or operated by the service provider of the SLM service (for example, an ISV who wants to protect the use of their software by a hardware mechanism). In an embodiment, the SE only trusts the Authorization Server initially when the computing platform is shipped. Subsequently, the Authorization Server can be used to delegate the trust relationship to the License Server for the management of SLM Service. In this way the SLM Service may be added by the user after the computing platform has been purchased. This provides the flexibility for the user to select a SLM Service provider from a multitude of providers that provide similar services. This also provides a secure way of delegating the trust relationship only to the service providers who have a business relationship with the SE manufacturer.

Returning back to FIG. 2, if the CLS activation process is unsuccessful, an error condition may be reported and activation processing ends. If activation of the SLM Service is successful, at block 206 the License Server 120 synchronizes its time with the SLM Service so that a lease time period can be set properly during download of the license. After the time has been synchronized, the Host Application 116 prompts the user to enter a password at block 208.

At block 210, the Host Application receives the user password (via well known computing platform input techniques), encrypts the user password with the public key of the SLM Service 112 (which is stored in the secure storage within the SE during the manufacturing process), and sends the encrypted password to the Authorization Server 122. At block 212, the Authorization Server signs the encrypted password with the Authorization Server's private key, and sends the resulting message (signed, encrypted user password) to the SLM Service 112. At block 214, the SLM Service verifies the message using the Authorization Server's public key (stored at manufacturing time in the SE), decrypts the encrypted password using the SLM Service's private key, and stores the user password in secure storage 109 if the verification is successful.

Deactivation of the SLM Service may be accomplished by performing the CLS deactivation process and replacing the activation Authorization with a null Authorization.

Figure 4:
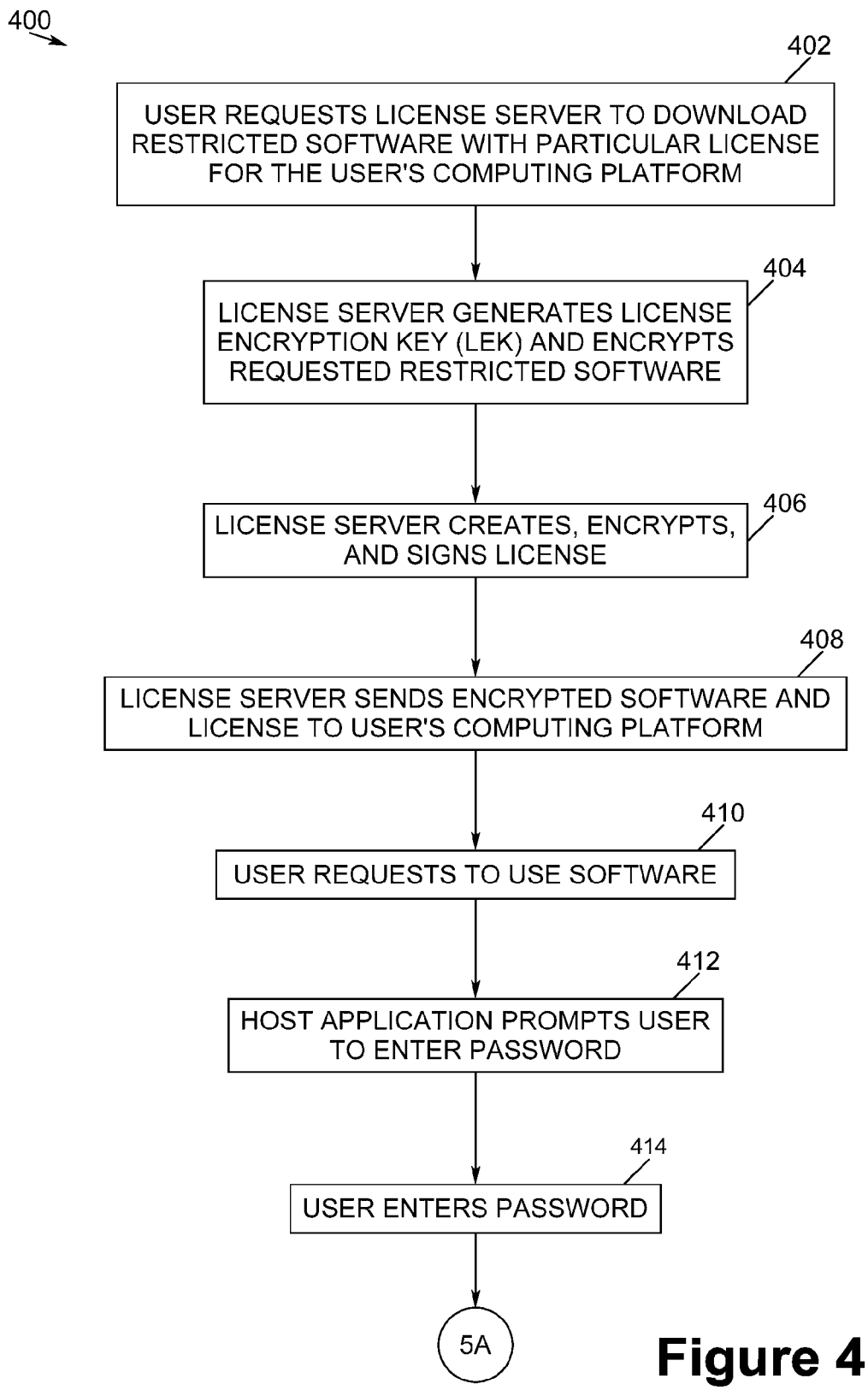
FIGS. 4 and 5 are diagrams of a process for obtaining a license and authorizing restricted software according to an embodiment of the present invention.
Figure 5:
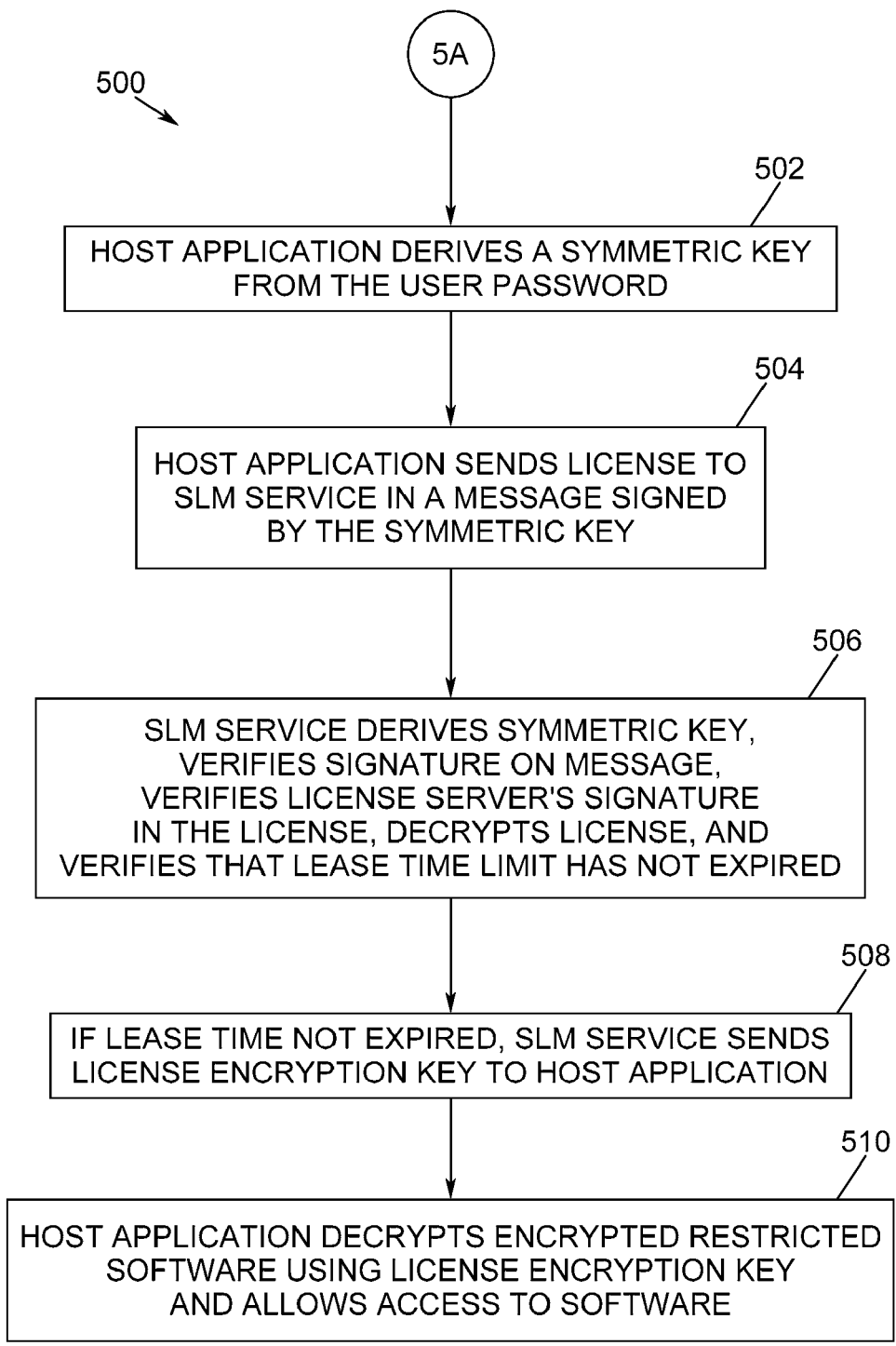

FIGS. 4 and 5 are diagrams of a process 400, 500 for obtaining a license and authorizing restricted software according to an embodiment of the present invention. At block 402, the user requests the License Server 120 to download restricted software with a particular license for use on the user's computing platform 102. In an embodiment, the request may be made via the Host Application. At block 404, the License Server generates a License Encryption Key (LEK) and encrypts the requested restricted software using the LEK. In an embodiment, the LEK comprises a symmetric key. At block 406, the License Server creates the license using the LEK. In an embodiment, the license includes a unique identifier for the requested restricted software, information about the user, the lease period for using the software, and the LEK. The License Server encrypts the license using the SLM Service's public key. In an embodiment, the Host Application sends the SLM Service's public key to the License Server as part of the user request. The License Server signs the license using the License Server's private key.

At block 408, the License Server sends the encrypted restricted software and the signed license to the Host Application on the user's computing platform. In an embodiment, the Host Application stores the encrypted restricted software and the signed license in a memory on the computing platform. In another embodiment, the encrypted restricted software and/or the license may be stored in secure storage 109. At block 410, the user requests to use the software. At block 412, the Host Application prompts the user to enter the user's password. At block 414, the user enters the password. Processing continues with block 502 on FIG. 5.

At block 502, the Host Application derives a symmetric key from the user password. In an embodiment, this process may be implemented according to Password-Based Cryptography Specification (PKCS #5), Version 2.0, September 2000, by B. Kaliski, RSA Laboratories, Request for Comments 2898. In other embodiments, other key generation mechanisms may be used. At block 504, the Host Application sends the encrypted license to the SLM Service 112 over the SEI 114 in a message signed by the symmetric key. At block 506, the SLM Service derives the symmetric key from the user password stored at block 214. The SLM Service then verifies the digital signature on the message. If message signature is verified correctly, the SLM Service further verifies the License Server's signature on the encrypted license using the License Server's public key. If the license signature is verified, the SLM Service decrypts the encrypted license using the SLM Service's private key, and verifies that the lease time limit has not expired. If the lease time limit has not expired, at block 508, the SLM Service extracts the LEK from the license and sends the LEK to the Host Application. At block 510, the Host Application decrypts the encrypted restricted software using the LEK and allows access to the software on the computing platform.

In an embodiment, the LEK is unique and generated for a specific lease period only, and may be a one-time use only. Once the LEK used, even if a hacker gains access to the key, it may not be useful. In an embodiment, the SLM service can decrypt the encrypted software using the LEK and provide the resulting decrypted software to the Host Application. In an embodiment, the LEK is temporarily stored in memory, but not on a hard drive. For further protection, in an embodiment, the Host Application may be made tamper-resistant according to known methods.

In an embodiment, multiple Authorizations may be installed on the computing platform so the user can simultaneously subscribe to restricted software products available from multiple software vendors.

In an embodiment, known anti-theft technology for computing platforms may be included to further protect the computing platform. In one embodiment, if a theft condition is triggered, the SLM Service will not send the License Encryption Key (LEK) to the Host Application, thereby protecting the software from being used on a stolen computing platform. In another embodiment, if a theft condition is triggered, the SLM Service does not decrypt the encrypted software.

In an embodiment, the Host Application may comprise an installation functionality as described above. In another embodiment, the Host Application includes the installation functionality as well as the restricted software. In an embodiment, installation may be performed only once for the computing platform. In another embodiment, installation may be performed prior to each attempted installation of any restricted software.

Figure 6:
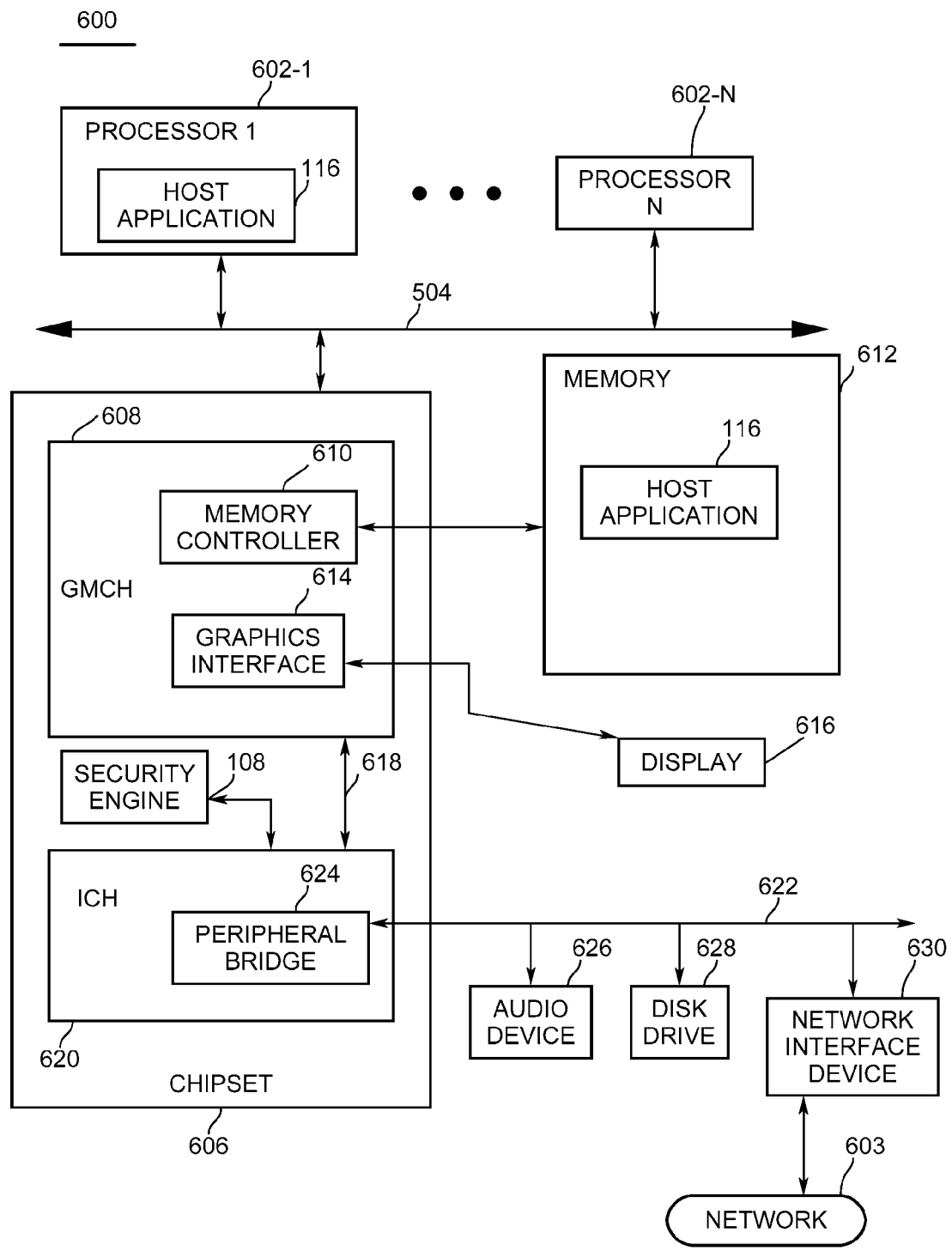
FIG. 6 is a diagram of a computing platform according to an embodiment of the present invention.

FIG. 6 illustrates a block diagram of a computing platform environment according to an embodiment of the present invention. In various embodiments, one or more of the components of the system 600 may be provided in various electronic devices capable of performing one or more of the operations discussed herein with reference to some embodiments of the invention. For example, one or more of the components of the system 600 may be used to perform the operations discussed with reference to FIGS. 1-5, e.g., by processing instructions, executing subroutines, etc. in accordance with the operations discussed herein. Also, various storage devices discussed herein (e.g., with reference to FIG. 6) may be used to store data, operation results, etc. In one embodiment, data received over the network 603 (e.g., via network interface devices 630) or from a local memory device may be stored in caches present in processors 602. These processors may then apply the operations discussed herein in accordance with various embodiments of the invention. The example computing system of FIG. 6 may be embedded in a mobile computing device, a handheld computing device, or a stationary computing device.

More particularly, the computing system 600 may include one or more central processing unit(s) (CPUs) 602 or processors that communicate via an interconnection network (or bus) 604. Hence, various operations discussed herein may be performed by a processor in some embodiments. Moreover, the processors 602 may include a general purpose processor, a network processor (that processes data communicated over a computer network 603, or other types of a processor (including a reduced instruction set computer (RISC) processor or a complex instruction set computer (CISC)). Moreover, the processors 602 may have a single or multiple core design. The processors 602 with a multiple core design may integrate different types of processor cores on the same integrated circuit (IC) die. Also, the processors 602 with a multiple core design may be implemented as symmetrical or asymmetrical multiprocessors. Moreover, the operations discussed with reference to FIGS. 1-5 may be performed by one or more components of the system 600. In an embodiment, a processor (such as processor 1 602-1) may comprise Secure License Management Service and/or Capability Licensing Service, as hardwired logic (e.g., circuitry) or microcode. In an embodiment, these components may be implemented as firmware stored in the Security Engine.

A chipset 606 may also communicate with the interconnection network 604. The chipset 606 may include a graphics and memory control hub (GMCH) 608. The GMCH 608 may include a memory controller 610 that communicates with a memory 612. The memory 612 may store data, including sequences of instructions that are executed by the processor 602, or any other device included in the computing system 600. Furthermore, memory 612 may store one or more of the programs or algorithms discussed herein such as Host Application 116 (prior to loading into processor 602 for execution), an encrypted license, an encrypted restricted software program, instructions corresponding to executables, mappings, etc. Some or at least a portion of this data (including instructions) may be stored in disk drive 628 and/or one or more caches within processors 602. In one embodiment of the invention, the memory 612 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 604, such as multiple processors and/or multiple system memories.

The GMCH 608 may also include a graphics interface 614 that communicates with a display 616. In one embodiment of the invention, the graphics interface 614 may communicate with the display 616 via an accelerated graphics port (AGP). In an embodiment of the invention, the display 616 may be a flat panel display or a touch screen display that communicates with the graphics interface 614 through, for example, a signal converter that translates a digital representation of an image stored in a storage device such as video memory or system memory into display signals that are interpreted and displayed by the display 616. The display signals produced by the interface 614 may pass through various control devices before being interpreted by and subsequently displayed on the display 616.

A hub interface 618 may allow the GMCH 608 and an input/output (I/O) control hub (ICH) 620 to communicate. The ICH 620 may provide an interface to I/O devices that communicate with the computing system 600. The ICH 620 may communicate with a bus 622 through a peripheral bridge (or controller) 624, such as a peripheral component interconnect (PCI) bridge, a universal serial bus (USB) controller, or other types of peripheral bridges or controllers. The bridge 624 may provide a data path between the processor 602 and peripheral devices. Other types of topologies may be utilized. Also, multiple buses may communicate with the ICH 620, e.g., through multiple bridges or controllers. Moreover, other peripherals in communication with the ICH 620 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices. In an embodiment, the ICH may comprise a security engine 108. In one embodiment, the Security Engine may be implemented as firmware within the ICH.

The bus 622 may communicate with an audio device 626, one or more disk drive(s) 628, and a network interface device 630, which may be in communication with the computer network 603 (such as the Internet, for example). In an embodiment, the device 630 may be a network interface controller (NIC) capable of wired or wireless communication. Other devices may communicate via the bus 622. Also, various components (such as the network interface device 630) may communicate with the GMCH 608 in some embodiments of the invention. In addition, the processor 602, the GMCH 608, and/or the graphics interface 514 may be combined to form a single chip.

In an embodiment, Security Engine 108 communicates over bus 622 (via ICH 620) and network interface device 630 to network 603 independently of any activity by processor 602.

Furthermore, the computing system 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive, a floppy disk, a compact disk ROM (CD-ROM), a digital versatile disk (DVD), flash memory, a magneto-optical disk, or other types of nonvolatile machine-readable media that are capable of storing electronic data (e.g., including instructions).

In another embodiment, components of the system 600 may be arranged in a point-to-point (PtP) configuration. For example, processors, memory, and/or input/output devices may be interconnected by a number of point-to-point interfaces. In an embodiment, chipset 606 may comprise a memory controller hub (MCH) and the Security Engine.

In various embodiments of the invention, the operations discussed herein, e.g., with reference to FIGS. 1-5, may be implemented as hardware (e.g., logic circuitry), software (including, for example, micro-code that controls the operations of a processor such as the processors discussed with reference to FIG. 6), firmware, or combinations thereof, which may be provided as a computer program product, e.g., including a tangible machine-readable or computer-readable medium having stored thereon instructions (or software procedures) used to program a computer (e.g., a processor or other logic of a computing device) to perform an operation discussed herein. The machine-readable medium may include a storage device such as those discussed herein.

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Additionally, such computer-readable media may be downloaded as a computer program product, wherein the program may be transferred from a remote computer (e.g., a server) to a requesting computer (e.g., a client) by way of data signals, via a communication link (e.g., a bus, a modem, or a network connection).

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A method of provisioning a license and an application program from a first server to a computing platform over a network, the license being encrypted by the first server using a first public key and including a second key, the application program being encrypted by the first server using the second key, comprising:

receiving a user password by a host application being executed by a processor of the computing system;

deriving, by the host application, a symmetric key at least in part from the user password;

sending the license, by the host application, to a license management firmware component of a hardware-implemented security engine within a chipset of the computer system, in a message signed by the symmetric key;

deriving, by the license management firmware component, the symmetric key at least in part from the user password stored in a secure storage of the hardware-implemented security engine, verifying the signature on the message using the symmetric key, verifying the first server's signature on the license, and decrypting the license using a first private key of the license management firmware component corresponding to the first public key to obtain the second key;

sending, by the license management firmware component, the second key to the host application; and decrypting the application program by the host application using the second key.

2. The method of claim 1, further comprising connecting to the first server by the computing platform and downloading the host application to the computing platform.

3. The method of claim 2, further comprising activating an authorized communications channel between the first server and the license management firmware component by a capability licensing service component of the security engine prior to receiving the user password.

4. The method of claim 1, further comprising synchronizing the time in the license management firmware component with the time on the first server.

5. The method of claim 4, further comprising, after decrypting the license, verifying by the license management firmware component that a lease time limit for authorized use of the application program has not expired.

6. The method of claim 1, wherein the license comprises a unique identifier of the application program, a lease time limit for authorized use of the application program by the user's computing platform, and the second key.

7. The method of claim 1, further comprising not sending the second key from the license management firmware component to the host application if a theft condition has been triggered on the computing platform.

8. A computing platform comprising:
a processor to execute a host application;
a memory to store the host application; and
a chipset coupled to the processor over an interface, the chipset comprising a hardware-implemented security engine, the security engine including secure storage and a license management firmware component;
wherein the computing platform is configured to provision a license and an application program from a first server to the computing platform over a network, the license being encrypted by the first server using a first public key and including a second key, and the application program being encrypted by the first server using the second key;
wherein the host application, when executed, receives a user password, derives a symmetric key at least in part from the user password, and sends the license to the license management firmware component in a message signed by the symmetric key;
wherein the license management firmware component derives the symmetric key at least in part from the user password stored in the secure storage, verifies the signature on the message using the symmetric key, verifies the first server's signature on the license, decrypts the license using a first private key of the license management firmware component corresponding to the first public key to obtain the second key, and sends the second key to the host application; and
wherein the host application, when executed, decrypts the application program using the second key.

9. The computing platform of claim 8, wherein the computing platform connects to the first server and downloads the host application to store in the memory.

10. The computing platform of claim 9, wherein the hardware-implemented security engine comprises a capability licensing service component to activate an authorized communications channel between the first server and the license management firmware component prior to receiving the user password.

11. The computing platform of claim 8, wherein the license management firmware component synchronizes the time in the license management firmware component with the time on the first server.

12. The computing platform of claim 11, wherein, after decrypting the license, the license management firmware component verifies that a lease time limit for authorized use of the application program has not expired.

13. The computing platform of claim 8, wherein the license comprises a unique identifier of the application program, a lease time limit for authorized use of the application program by the user's computing platform, and the second key.

14. The computing platform of claim 8, wherein the license firmware component does not send the second key to the host application if a theft condition has been triggered on the computing platform.

15. A method of provisioning a license and an application program from a first server to a computing platform over a network comprising:
receiving, by a host application being executed by a processor on the computing platform, the license and the application program from the first server, the license being encrypted by the first server using a public key of a license management firmware component of a hardware-implemented security engine within a chipset of the computing platform, the application program being encrypted by the first server using a license encryption key generated by the first server, the encrypted license being signed by the first server's private key, and storing the signed, encrypted license and the encrypted application program in a memory of the computing platform;
obtaining a password from a user of the computing platform by the host application;
deriving, by the host application, a symmetric key at least in part from the password, and signing a message including the signed, encrypted license with the symmetric key;
sending the message from the host application to the license management firmware component of the hardware-implemented security engine;
deriving, by the license management firmware component, the symmetric key at least in part from the password;
verifying, by the license management firmware component, a signature on the message using the symmetric key; if the message signature verifies correctly, verifying a signature of the encrypted license using the first server's public key; if the license signature verifies correctly, decrypting the encrypted license using the license management firmware component's private key;
extracting, by the license management firmware component, the license encryption key from the license, and sending the license encryption key to the host application; and
decrypting, by the host application using the license encryption key, the encrypted application program, and allowing access to the application program on the computing platform.

16. The method of claim 15, further comprising the following steps prior to deriving the symmetric key by the license management firmware component:
receiving a password from a user of the computing platform by the host application;

encrypting, by the host application, the password with the public key of the license management firmware component;

sending, by the host application, the encrypted password to a second server, the second server being coupled to the computing platform over the network;

receiving, by the license management firmware component, the encrypted password being signed by the second server's private key; and verifying, by the license management firmware component, a signature of the encrypted password; if the signature verifies correctly, decrypting the encrypted password using the license management firmware component's private key, and storing the password in a secure storage within the security engine.

17. The method of claim 15, further comprising connecting to the first server by the computing platform and downloading the host application to the computing platform.

18. The method of claim 17, further comprising activating an authorized communications channel between the first server and the license management firmware component by a capability licensing service component of the security engine prior to receiving the user password.

19. The method of claim 15, further comprising synchronizing the time in the license management firmware component with the time on the first server.

20. The method of claim 19, further comprising, after decrypting the license, verifying by the license management firmware component that a lease time limit for authorized use of the application program has not expired.

21. The method of claim 15, wherein the license comprises a unique identifier of the application program, a lease time limit for authorized use of the application program by the user's computing platform, and the license encryption key.

22. The method of claim 15, further comprising not sending the license encryption key from the license management firmware component to the host application if a theft condition has been triggered on the computing platform.

23. A computing platform comprising:
a processor to execute a host application;
a memory to store the host application; and
a chipset coupled to the processor over an interface, the chipset comprising a hardware-implemented security engine, the security engine including secure storage and a license management firmware component;
wherein the computing platform provisions a license and an application program from a first server over a network;
wherein the host application receives the license and the application program from the first server, the license being encrypted by the first server using a public key of a license management firmware component of a hardware-implemented security engine within a chipset of the computing platform, the application program being encrypted by the first server using a license encryption key generated by the first server, the encrypted license being signed by the first server's private key, stores the signed, encrypted license and the encrypted application program in the memory, obtains a password from a user, derives a symmetric key at least in part from the password, signs a message including the signed, encrypted license with the symmetric key, and sends the message to the license management firmware component;
wherein the license management firmware component derives the symmetric key at least in part from the password, verifies a signature on the message using the symmetric key; if the message signature verifies correctly, verifies a signature of the encrypted license using the first server's public key; if the license signature verifies correctly, decrypts the encrypted license using the license management firmware component's private key, extracts the license encryption key from the license, and sends the license encryption key to the host application; and
wherein the host application decrypts the encrypted application program using the license encryption key and allows access to the application program on the computing platform.

24. The computing platform of claim 23, wherein the license management firmware component receives a password from a user of the computing platform by the host application, and encrypts the password with the public key of the license management firmware component;
wherein the host application sends the encrypted password to a second server, the second server being coupled to the computing platform over the network; and
wherein the license management firmware component receives the encrypted password signed by the second server's private key, verifies a signature of the encrypted password, if the signature verifies correctly, decrypts the encrypted password using the license management firmware component's private key, and stores the password in a secure storage within the security engine.

25. The computing platform of claim 23, wherein the computing platform connects to the first server and downloads the host application to store in the memory.

26. The computing platform of claim 25, wherein the hardware-implemented security engine comprises a capability licensing service component to activate an authorized communications channel between the first server and the license management firmware component prior to receiving the user password.

27. The computing platform of claim 23, wherein the license management firmware component synchronizes the time in the license management firmware component with the time on the first server.

28. The computing platform of claim 27, wherein, after decrypting the license, the license management firmware component verifies that a lease time limit for authorized use of the application program has not expired.

29. The computing platform of claim 23, wherein the license comprises a unique identifier of the application program, a lease time limit for authorized use of the application program by the user's computing platform, and the second key.

30. The computing platform of claim 23, wherein the license firmware component does not send the second key to the host application if a theft condition has been triggered on the computing platform.

* * * * *